(12) United States Patent
Valpola et al.

(10) Patent No.: US 8,332,336 B2
(45) Date of Patent: Dec. 11, 2012

(54) METHOD FOR SELECTING INFORMATION

(75) Inventors: Harri Valpola, Helsinki (FI); Antti Yli-Krekola, Helsinki (FI)

(73) Assignee: Zenrobotics Oy, Helsinki (FI)

( * ) Notice: Subject to any disclaimer, the term of this patent is extended or adjusted under 35 U.S.C. 154(b) by 724 days.

(21) Appl. No.: 12/528,374

(22) PCT Filed: Feb. 22, 2008

(86) PCT No.: PCT/FI2008/000031
§ 371 (c)(1),
(2), (4) Date: Oct. 1, 2009

(87) PCT Pub. No.: WO2008/102052
PCT Pub. Date: Aug. 28, 2008

(65) Prior Publication Data
US 2010/0088259 A1    Apr. 8, 2010

(30) Foreign Application Priority Data
Feb. 23, 2007 (FI) ........................ 20070159

(51) Int. Cl.
G06N 5/00 (2006.01)
(52) U.S. Cl. ........................... 706/14; 706/45
(58) Field of Classification Search ........... 706/14, 706/45
See application file for complete search history.

(56) References Cited

U.S. PATENT DOCUMENTS
2003/0217029 A1   11/2003  Heckerman
2006/0155660 A1    7/2006  Koshizen et al.
2006/0224532 A1   10/2006  Duan et al.

FOREIGN PATENT DOCUMENTS
WO    02061678 A    8/2002

OTHER PUBLICATIONS

Saar-Tsechansky, et al., Active Feature-Value Acquisition, McCombs research paper series No. IROM-08-06, Sep. 2007, pp. 1-32.*
Valpola,"Behaviourally meaningful representations from normalisation and context-guided denoising," AI Lab Technical Report, University of Zurich, 2004, pp. 1-8, URL:http://cogprints.org/3633/1/tr04a.pdf>.

(Continued)

Primary Examiner — Wilbert L Starks
(74) Attorney, Agent, or Firm — Browdy and Neimark, PLLC

(57) ABSTRACT

In the method of the invention, information is selected in a processing unit. The end result to be achieved is final feature information to be used for performing a task. In the method, input information to the processing unit is treated with the intention to find useful information from the input information in view of the task. Feature information representing characteristics of the input information is formed from the input data, the values of the feature information being further processed on the basis of their utility. The method is mainly characterized in that a preliminary prediction is formed from a first context of a sot of input information by means of first parameters and in that the first primary input of the set of input data is preprocessed by forming calculation results by means of second parameters.

21 Claims, 10 Drawing Sheets

OTHER PUBLICATIONS

Valpola,"Development of Representations, Categories and Concepts-a Hypothesis," Computational intelligence in robotics and automation, 2005. Cira 2005, Proceedings. 2005 IEEE International symposium on ESPOO, 2005, pp. 593-599, Piscataway, NJ, USA.

Yli-Krekola,"A bio-inspired computational model of covert attention and learning," Internet citation, 2007, p. 93pp, URL:http://www.Ice.hut.fi/{aylikrek/AnttiYKdippa.pdf>.

Särelä, et al.,"Denoising Source Separation," Journal of Machine Learning Research, 2005, pp. 233-272, vol. 6, MIT Press, Cambridge, MA, US.

* cited by examiner

METHOD FOR SELECTING INFORMATION

TECHNICAL FIELD

The object of the invention is a method suitable for example for control, pattern recognition or prediction, which method is used for integration and selection of information and learning of its representation.

BACKGROUND OF THE INVENTION

Information in input signals or observation data has to be handled in many applications, like computer vision or controlling of an autonomic robot and several different kinds of methods have been developed for this purpose.

For instance, several such methods have been presented in machine learning and in statistical analysis, which can be used to learn the representation of information, in other words parameters that define the representation of information are adapted on the basis of observation data. The purpose of adaptation is often to find such useful features from observations, which can be used for instance for pattern recognition, control or corresponding actions. For example independent component analysis is used to find descriptive features of input signals from observation data. Common for many of these methods is that, based on input vectors, an information processing unit forms feature vectors, which describe properties of input vectors and the meaning of the elements of the feature vectors, in other words the features, changes as a result of adaptation. As a state vector of a Kalman filter can be considered as a feature vector, the state vector describes information in input vectors.

Many of these above described methods can be interpreted in view of Bayesian statistics, where the probabilities describe a degree of belief and Bayes' rule specifies how to integrate information from different sources. For example when a value of a state vector is calculated in case of a Kalman filter, the information obtained from observation signals and previous values of state vectors is combined. In terms of Bayesian statistics: a prior distribution, which is calculated by using previous state vectors, and likelihood, which is calculated on the basis of observation signals, are combined to a posterior distribution of the state vector, which describes the probabilities of different state vector values. Posterior distribution follows Gaussian distribution in the case of the Kalman filter and it is represented by means of a posterior mean and covariance. In some other methods, the posterior uncertainty is not represented at all, but these methods can nevertheless be interpreted as approximations of the Bayesian method.

Worth noticing in the methods is that the value of a feature vector describes an observation signal, but the information is also integrated from prior information.

Pattern recognition is a part of machine learning based on information aims to develop models or systems that recognize patterns. Pattern recognition is applied e.g. in information technology and robotics but also in medical technology and research of human computer interaction. A pattern recognition system is defined as a process with four steps—measurement, preprocessing, feature extraction and classification.

In the first step, the data needed is acquired, mainly by measuring physical variables and by converting obtained analogical data in digital form. In the second step, data are preprocessed, often by using different kinds of digital signal processing methods, like filtering or principal component analysis. In the third step, preprocessed measurement data is mapped into the feature space. In this step, the data can be seen to be converted into information. In the fourth step, the samples mapped into the feature space, are categorized into two or more categories by using a classifier.

In demanding pattern recognition tasks, like handwritten character recognition, processing of feature vectors is organized hierarchically often in such a way that several processing units exist on each level and they get feature vectors as input from a part of the units of lower levels of hierarchy. In such systems, processing units can, as a context, get features from higher units and possibly also from units on the same level. An advantage of using hierarchy is that the number of connections remains low, but it is anyway able to integrate information from a large amount of input signals. A classic example of such a hierarchical model is Neocognitron by Fukushima (Fukushima, 1980).

In many applications, one faces a situation, in which the observation data contains more statistical structure than the processing unit used is able to represent. In such a case, it is necessary to select information that is useful to the task. It is often necessary to adapt the model in such a way that the features it represents describe information useful to the task.

In some cases, a supervised learning, which is a machine learning method, is suitable for a controlled selection of useful features. Controlled learning corresponds to regression in statistics. The goal of the regression is to find a mapping from one input vector to another one, called a target vector. If the mapping from input vectors to target vectors is done in several steps, the intermediate results can be interpreted as feature vectors especially if the structure of the model is chosen in such a way that the dimension of the intermediate result is smaller than that of the input and target vectors (Hecht-Nielsen, 1993). In the simplest case, two sequential linear mappings can be used, the result being essentially the same as in canonical correlation analysis. The input vector can be interpreted as a primary input and the target vector as a context, because the feature vector, in which above described supervised learning methods are utilized, depends immediately on the input vector, but during the teaching, the representation is modified in such a way that the features contain as much information from the target vector as possible.

A problem with these methods is that a huge amount of observation data are needed for the supervised learning of multi-step mapping, making learning of many everyday problems unpractically slow or impossible when adequate observation data are lacking. Typically, one tries to solve the problem by using some supervised learning method as a preprocessing, for example the above mentioned independent component analysis. In such a solution, the problem is that supervised learning only aims to describe the observation data, but it does not try to select information useful to the task. One solution presented is e.g. the finding of time invariant features. However, this very often does not limit the set of potentially useful features to a sufficient extent and on the other hand useful information, which does not happen to be time-invariant, may be lost.

Basically, the problem is that methods based on Bayesian statistical inference (as the hierarchical temporal memory described in the publications WO2006063291 and US2007005531) are able to represent the degree of belief and the phenomena underline the observations, but the selection of useful information is by nature a decision theoretical problem. In addition to the degree of belief, it is important to consider the utility, as it is called in decision theory. The probability of the feature answers the question, whether the feature is present in the observations, but also the utility, which is obtained if the existing feature is present, needs to be considered.

Methods that solely use statistical inference are especially unsuitable for situations, wherein useful information has to be selected dynamically. In many everyday problems—for example in the control of robot-hand grasping—it is important to be able to select information relevant to the current task and the control problem is significantly easier if only useful information is represented (for instance the position of the hand, the place and shape of the target object and possible obstacles between the hand and the object) instead of all the information given by the sensors (cameras, microphones and so on).

The cortex of human beings and other mammals can solve the types of problems described above. The cortex is able to integrate enormous amounts of information given by the senses, to select the parts essential to the task (selective attention, dynamical selection) and to modify its representations in a direction useful to different kinds of tasks (learning, modification of parameters). The development of many methods resemble those described in this publication, has therefore been inspired by the function of cortex of human beings and other mammals.

Selective attention has been shown to emerge from systems that consist of several information processing units, if every unit selects the information it represents on the basis of what information other units transmit to it as context (for example Usher and Niebur, 1996). Selective attention emerges if the units aim to select, from their own primary input, the information that fit the context. Because it mostly is useful to alternate the target of attention, also such a mechanism is needed that prevents the attention focus on the same thing for too long. Many methods for this purpose exist (e.g. Lankheet, 2006).

It is known that selective attention in humans plays a central role for learning associations between features (Kruschke, 2001) and also for the supervising of the learning of presentations. In previous models, this has, however, either not been implemented at all or then the targets of the attention have been determined in some way in advance. Walther and Koch (2006) used the latter method. Their model is unable to adapt to new types of objects, instead the attention and learning only work for objects which fulfills such criterions of so called proto-objects that are set in advance.

The aim of the so called Principal components analysis (PCA) is to find those components, by means of which the central features multidimensional data can be represented from without loosing important. The principal components analysis orders the components of the input data according to their eigen values.

After the principle components analysis, it is necessary to select which can be discarded as less important, because the method does not automatically discard any components, it only sets the components found in an order of magnitude. It is one of the most central methods in pattern recognition and signal processing.

In the method presented in the article: "A neurodynamical cortical model of visual attention and invariant object recognition", Vision Research 44 (2004) 621-642, by Deco and Rolls (2004), the dynamic selection takes place on the basis of context. Pre-activations are calculated for the features solely on the basis of "primary input". After that, the pre-activations of the features, predicted from the context, are strengthened. Finally the strongest activations are selected. Thus, the context affects which features will be selected for representation. However, a separate method was used for the adaptation of the parameters presented by Wallis, Rolls and Földiák. No real context is used in this method. (G. Wallis, E. T. Rolls and P. Földiák, "Learning invariant responses to the natural transformations of objects". International Joint Conference on Neural Networks, 2:1087-1090, 1993.) So in the article of Rolls and Deco, a method was used in which the parameters were first adapted by one method and then the obtained parameters were used in dynamical selection of feature information based on predictions made from the context.

Canonical correlation analysis takes the context into consideration in the adaptation of the parameters, but information is not selected dynamically.

The following publications are presented as prior art in addition to those mentioned above.

K. Fukushima, "Neocognitron: A self-organizing neural network model for a mechanism of pattern recognition unaffected by shift in position". Biological Cybernetics, 36:193-202, 1980.

R. Hecht-Nielsen, "Replicator neural networks for universal optimal source coding". Science, 269:1860-1863, 1995.

J. K. Kruschke, "Toward a unified model of attention in associative learning". Journal of Mathematical Psychology 45:812-863, 2001.

M. J. M. Lankheet, "Unraveling adaptation and mutual inhibition in perceptual rivalry". Journal of Vision, 6:304-310, 2006.

M. Usher and E. Niebur, "Modeling the temporal dynamics of IT neurons in visual search: A mechanism for top-down selective attention". Journal of cognitive neuroscience, 8:311-327, 1996.

G. Wallis, E. T. Rolls and P. Földiák, "Learning invariant responses to the natural transformations of objects". International Joint Conference on Neural Networks, 2:1087-1090, 1993. Wallis, Rolls and Földiák adapt parameters, but they use timely invariance of produced features as a criterion for the adaptation. So context is not used at all.

D. Walther and C. Koch, "Modeling attention to salient proto-objects". Neural Networks, 19:1395-1407, 2006.

Because learning of the features and their dynamical selection, are separate processes, information which is obtained by selective attention can not be utilized in the learning.

The object of the method of this application is to combine adaptation of parameters that define the features with dynamical selection of feature information in such a way that the method both learns and selects features useful for the task.

SUMMARY OF THE INVENTION

The information processing method of the invention is mainly characterized by the characterizing part of claim 1.

In the method of the invention, information is selected in a processing unit. The end result to be achieved consists of the final feature information to be used for the performing of a task. In the method, input information of a processing unit is processed in order to find information useful to the task, from input information. The input information consists of primary inputs and context that represents general information for performing a task. Feature information that presents properties of the input information is formed from the input information. The values of the feature information are processed further on the basis of their utility. The method is mainly characterized in that a preliminary prediction about the end result is formed from a context of a first set of input information by means of first parameters, and in that the first primary input of the set of input information is pre-processed by forming computation results on the basis of second parameters. The utility of the information obtained in the foregoing steps is estimated by combining the obtained prediction and the computation results in such a way that useful features are selected from the computation results on the basis of the prediction, i.e. feature information is formed by emphasizing useful properties and by weakening other properties. Then, the second parameters are modified so that the step in which the primary input was preprocessed would from the very beginning have given calculation results which correspond to the feature information obtained in the estimation step. After that the next context and primary input of the set of input information and primary input are taken for treatment and the above presented steps are repeated for each member of the set of input information in order to obtain the final feature information The preferable embodiments of the invention are presented in the subclaims.

In one such embodiment, the first parameters are also modified in such a way that they would have given the computation results corresponding to the feature information.

In the following, some terms in the claims and text are explained for facilitating understanding of the claims.

In this publication, the primary input is the information which the features primarily describe and the context consists of other auxiliary information, which is used in other ways to supervise the formation of the feature vector.

In the invention, the feature information is primarily thought to be presented as numerical values or scalars, i.e. as larger or smaller numbers. The term activation is a synonym to the numerical value of the feature. The term activation function is used in neural networks. It tells how the value of the feature is computed from the input vectors and the parameters. The use of the term activation includes in general, as in this text, the assumption that the zero level is the default value meaning that the phenomenon described by a feature is not present in the input vector. A value that differs from zero tells that the phenomenon described by a feature is present in an input vector, the stronger or more probably the larger the numerical value of the feature is. The feature information is selected on the basis of utility in this invention. The selection of information is implemented by changing a value of a feature closer to the zero level if the method considers the utility of presenting the feature as small.

A set of input information consists of several pieces of input information (e.g. several successive camera pictures and sensory data), which in turn consist of several numerical values. A member of a set means one element in the set.

Correlation is a term used in probability calculation and statistics. It describes the dependence between two variables. More precisely, it is a numerical measure for the linear dependence of two random variables. There is no correlation between two independent variables. The correlation between two vectors is a correlation matrix, whose elements describe the correlations between the elements of the vectors. In statistics, a correlation, as well as a mean value, is always defined over some group. In this text, the correlation is computed over a set of input information or over the results computed from it.

Decorrelation is a computation step, wherein a vector is multiplied by such a parameter matrix that the elements of the vector, to be obtained as the end result, have as few mutual correlations as possible. The parameter matrix used in decorrelation is modified during the processing of new vectors on the basis of the correlations observed in such a way that the correlation would not exist anymore in the vectors to be processed later.

An average activation level is in practice the same thing as a mean value. In the detailed description of the invention, the term pre-activation is used, in the implementation presented later for such a vector produced by an adaptive pre-processor which is not yet the final feature vector (feature information).

The fact that attention emphasizes learning not only changes the targets of learning but also makes the learning itself more efficient. When the other objects can be discarded by the attention, it is possible to learn properties of the target object from the remaining information. The model of Walter and Koch is based on the same phenomenon, even though the attention is not adaptive in the same way as in the method of this application. In their model it works merely as a preprocessing step. Although the selection of objects cannot work perfectly before the objects themselves have been learned, learning can be biased already with incomplete information. However, on average, the biasing goes in the right direction.

Combining learning and attention accelerates learning, as the learning is disturbed by objects appearing together. In existing systems, a considerable amount of human work is needed for the preselection of the objects of the observation data used in the teaching step.

The method of the application automates this step, which not only decreases the need of human work but also enables autonomous learning of the method and in that way enables the use of the method in for example an autonomic robot. The basis of the main claim is that it takes the context into account both in the dynamic selection of useful information and the adaptation of parameters. Previously, methods have been presented in which input information consists of two types of inputs, a primary input and a context, but in them, the context is not utilized efficiently.

Canonical correlation analysis takes the context into account when parameters are adapted, but it does not select features dynamically on the basis of context. Wallis, Rolls and Földiák in turn adapt parameters, but they do not use context at all. (G. Wallis, E. T. Rolls and P. Földiák, "Learning invariant responses to the natural transformations of objects". International Joint Conference on Neural Networks, 2:1087-1090, 1993.). The previously known so called Principal components analysis solely adapts values of the primary input, whereas in the method presented by Deco and Rolls (2004) in the article "A neurodynamical cortical model of visual attention and invariant object recognition", Vision Research 44 (2004) 621-642, the dynamical selection actually is performed on the basis of context, but in the article, a method is presented in which the adaptation of the parameters first takes place by using one method and the obtained parameters are used for dynamic selection of the feature information on the basis of the prediction obtained from the context. First, preactivations for the features are computed, based on the primary input. Then the preactivations of the features predicted from the context are strenghtened. Finally, the strongest activations are selected. Thus, the context affects on which features are selected for the representation but not for the adaptation of the parameters.

In the method of the invention both dynamical selection based on context and adaptation of the parameters based on context are performed.

The method of the invention can be performed either in one or in several processing units. In the latter case, they are connected together so that they share the feature information they produce, with each other as a context.

The processing units can either work together or alone and they can be connected in parallel or hierarchically to each other. When the units are connected to each other in such a way that their feature vectors are mediated to the other units as context and each of these units aims to present such information which is coherent with the context, a dynamical information selection process emerges in the system, which process corresponds to selective attention. In addition to the coherence, the utility of the features can be estimated in accordance with the novelty value: a feature, which cannot be predicted from the previous state or from the context of the unit, is more valuable than a feature which can be predicted. If a long-lasting activation of the feature decreases the utility, the target of attention varies even though the input would not change.

In certain types of hierarchical structures, a part of the context information can be so good at predicting the primary inputs that this part would totally dominate without a forced division into several groups. As the parameters are adapted in such a way that the feature information would be able to predict context, the feature information would be selected in such a way that it would be good at predicting only this part of the context information. However, there are often situations, wherein prediction of some context information is highly important. For instance, in a case of a robot, the control signals of the motors are such important information, which however is quite bad at predicting the features seen in a camera image. By dividing the context information into groups and by forcing each group to predict information of primary input, it can be ensured that the information that describes each group of context information can be found, not only the one whose information content is closer to the primary input.

Especially at learning i.e. when the parameters are modified, an estimate of the utility of an unpredicted feature can be increased when the unpredicted activation (a number other than zero) of this feature helps to predict the context.

The attention momentarily focuses on the information that has the highest utility, and consequently, the representation of the information is adapted in such a direction that essential things are emphasized or they have a better resolution in the long run.

An estimate of the progress of the operation of the system (5 and 6) can be included in the context on which the estimate of the utility is based. As the processing units make decisions about the activations of the feature vectors controlled by the utility, the activations can be used not only indirectly as inputs of some control system but also directly to give commands and control signals for instance to the motors that control an autonomic robot. Such a structure resembles the cortex of a human being, whose activations directly control motoneurons of the spinal cord.

In the following, examples of some different embodiments of the methods, their behavior and application are presented. These examples are given to facilitate understanding of the method, but they are not necessary ways to implement the method. The following figures are used as a help in the explanation of the examples.

FIGURES

DETAILED DESCRIPTION

In a method of the invention, a processing unit is taught to select, from existing input information, the information by use of which the best possible end result for a certain task is obtained, for example for controlling a robot or for diagnosing a disease. The right information has been selected from the input information when the utility has been maximized, i.e. a certain task has been performed in the best possible way.

Figure 1:
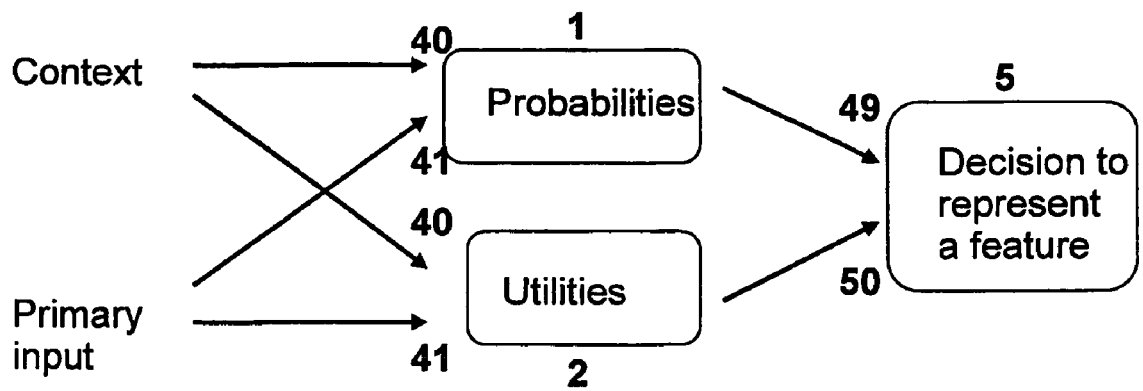
FIGS. 1 and 2 illustrate the idea of the invention theoretically.
Figure 2:
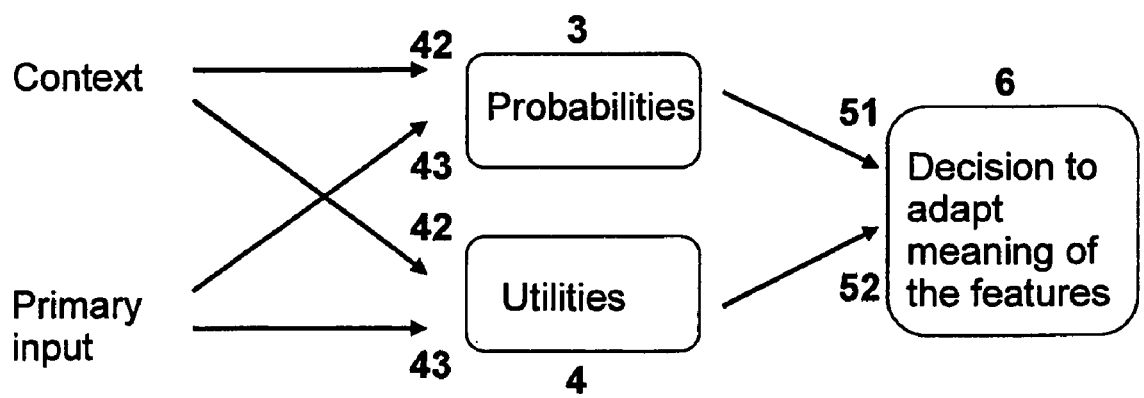

The basic idea of the invention is to take into account not only the probability that a feature is present in the observation, but also the utility of presenting a present feature when computing the activations (numerical values) of the features that describe primary inputs and when modifying the parameters. The basic principle is illustrated in FIGS. 1 and 2. Each of the processing units used in the method can be interpreted to estimate the probability (1 and 3) and utility (2 and 4) of features. According to the decision theory, the utility of the presentation of a feature is achieved by multiplying these. FIG. 1 corresponds to step c of the main claim and FIG. 2 to step d of the main claim.

Thus, the basic idea of the method of the invention is presented as a theoretical scheme in FIGS. 1 and 2 illustrating the use of statistical information and utility. These can be used in different ways in the two decision processes, in the selection of a presentation (activations) and in the adaptation of parameters.

Figure 3:
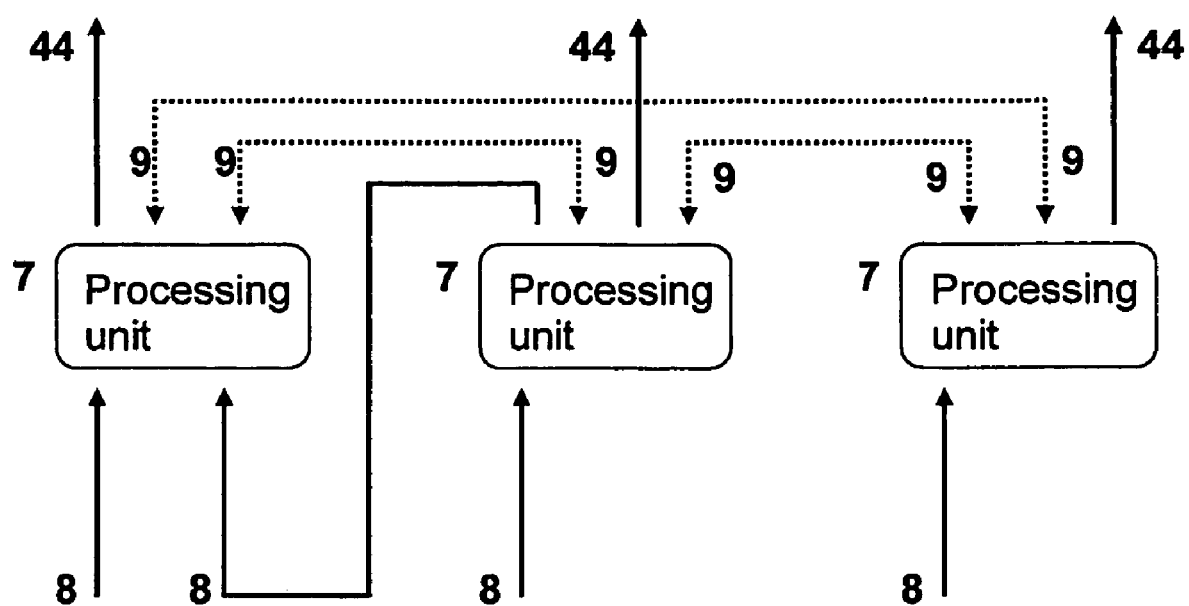
FIG. 3 illustrates an embodiment, in which several processing units have been used for the performing of the method of the invention.

When several units are used in the method, the way the processing units are interconnected influences on how the invention works. If they are set to give context to each other (claim 16), as in FIG. 3, they efficiently find connections between their primary inputs by using the method of the invention.

Figure 4:
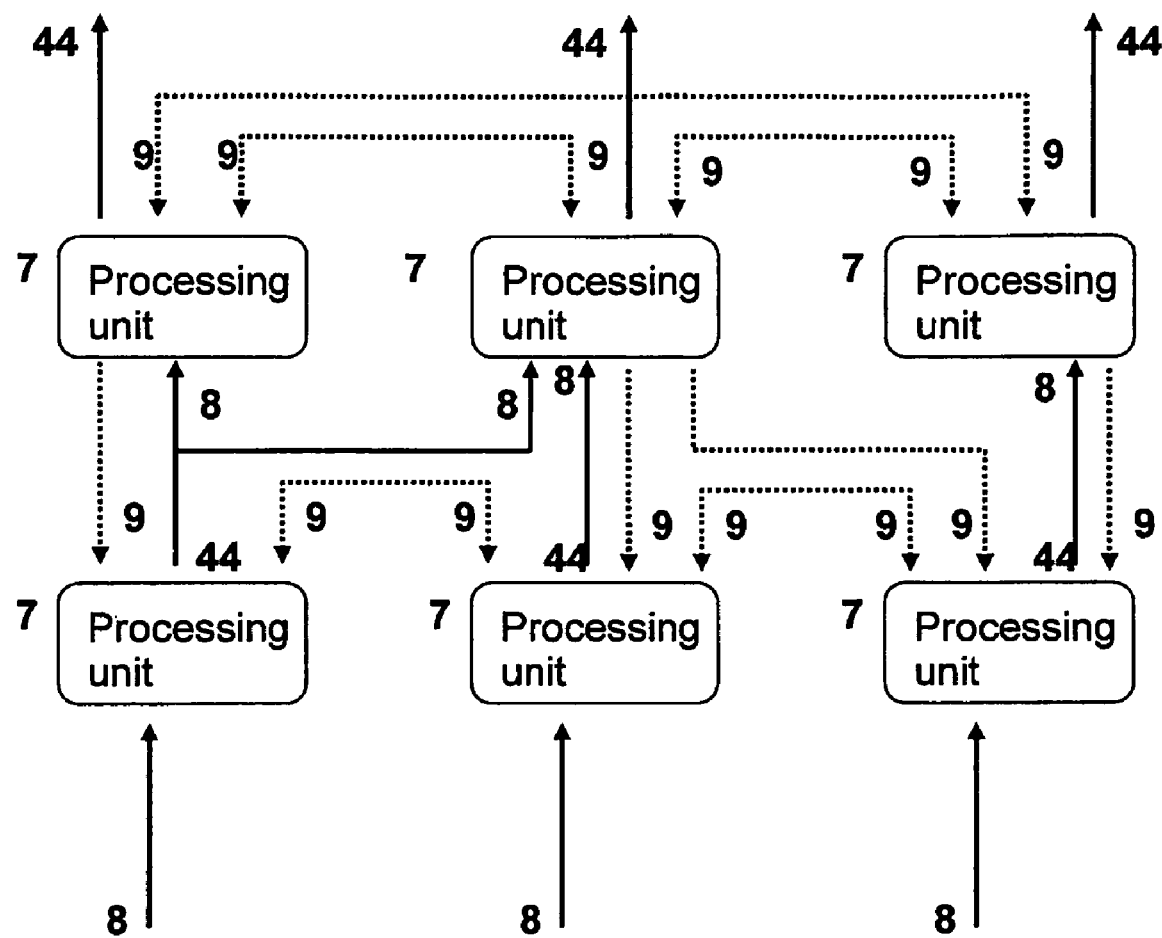
FIG. 4 illustrates an embodiment, in which the processing units are connected hierarchically.

In the method, wherein the units are connected hierarchically (claims 15 and 17), as shown FIG. 4, the units can moreover, on the upper levels, find abstract features from the inputs of the network. In addition, the processing units can give context to themselves from past moments. In this way, internal dynamics, for example slowly, of the own features of the processing unit can also be found for example slowly changing features.

When a system with many processing units is used, it is preferable to follow the following principles: if hierarchical processing units are used, it is preferable to use an architecture in which the processing units receive inputs from a wider area, the higher in the hierarchy they are. Thus, global features can be developed into the upper levels, which do not only describe a small portion of the network input. In order to make the features invariant, too, it is preferable to use dimension reduction in some processing units. That causes invariance because, a part of the information is filtered away. Dimension reduction can be implemented either in separate processing units or by including some kind of a pre-processor in the processing units, which can include, besides other processing, this dimension reduction.

The learning of different and useful features is faster and is facilitated, if the primary inputs are whitened before they are fed to a processing unit (claim 13). Here, whitening means decorrelation and normalization of the variances of all elements. Normalization and decorrelation are achieved by multiplying the primary inputs with a suitable whitening matrix. It is preferable to use whitening at least for the primary inputs of the lowest level of the whole system.

Figure 7:
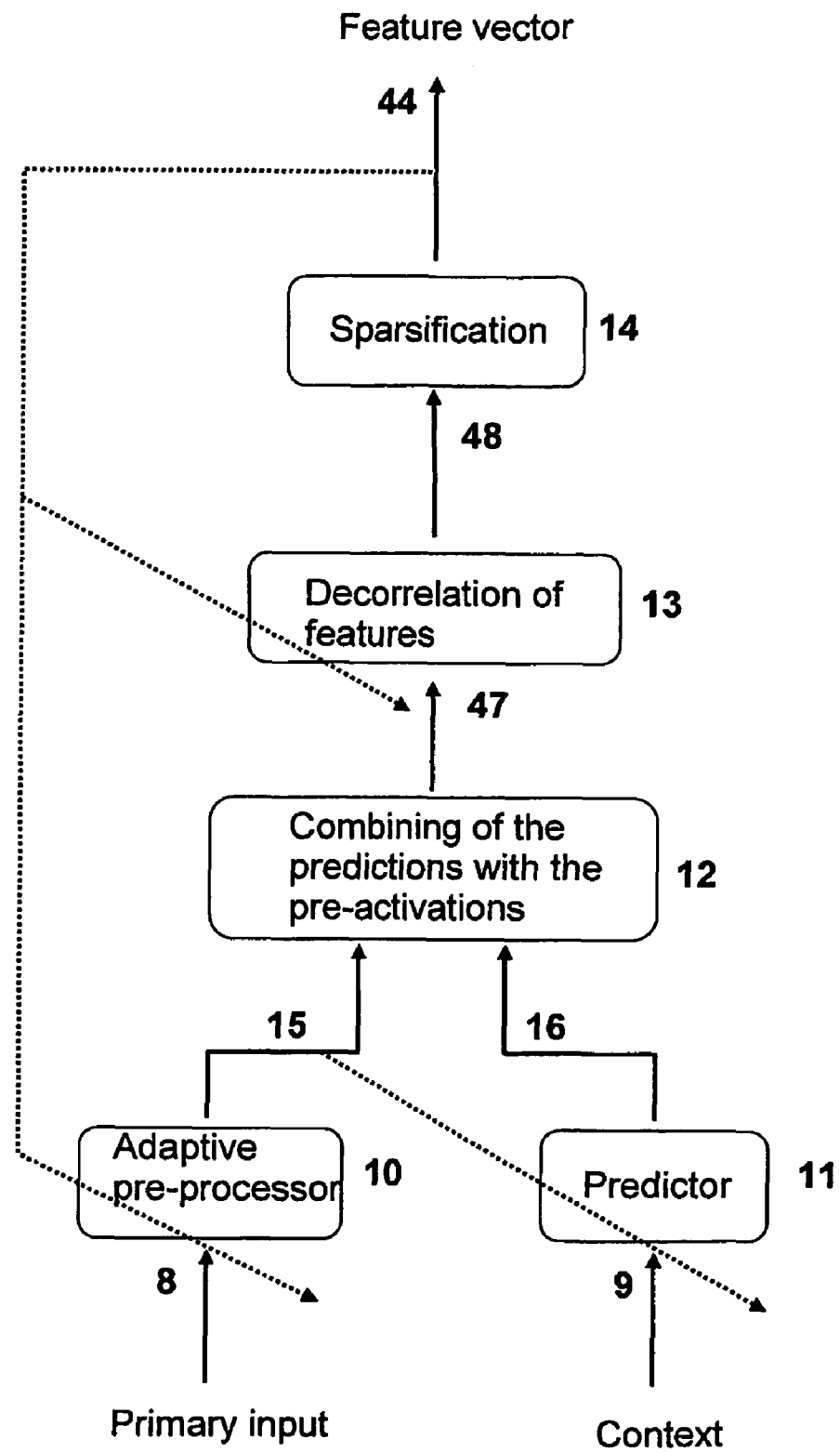
FIG. 7 illustrates an example embodiment of a processing unit.

FIG. 7 illustrates an example embodiment of a processing unit. When a network is working, it is preferable to perform the adaptation steps shown in FIG. 7 at time instants when it can be assumed that the activations of the network are substantially converged into a state in which information has had time to integrate from all parts of the network. This means that all processing units of the network are in practice iterated a few rounds in some order and after that the processing units are adapted by the resulting vectors. The updating order can for example be such that the processing units are operated in an order following the levels of the hierarchy. Random order is used inside each level. This kind of adaptation improves the discriminating ability of different features and the learning of features related to the context. If adaptation was performed after each update, there would not be enough time to integrate context information and the global attention would not have enough time to emerge so well, which is why different kinds of features would be mixed in the activations. In the embodiment of FIG. 7, the process for selecting feature representation and the feature adaptation process use different utility models as in FIG. 1. In other words, the features have adaptation utility only when they are coherent with global attention.

Instead, presentation utility also exists otherwise, for the purpose of gaining coherence. Moreover, also the probability models can be distinct. In an instantaneous representation of information, only present and past information can be used. Instead, when parameters are adapted, future information can be used as well, as it is not so crucial even if the adaptation would be done a bit later than in real time.

FIG. 7 illustrates one possible embodiment of a processing unit, which embodiment been used in the examples described in this text. The dashed line arrows, which have been drawn over some module, mean teaching the parameters of this module by means of information contained in the arrow, which in this case is always a feature vector (44), i.e. feature information. In this embodiment, the probability and utility of the features are not explicitly handled individually, instead both of them are mixed in both the pre-activations (15) and the prediction (16). The primary input (8) is directed to an adaptive pre-processor (10) according to step a) of the main claim. This is mapping into the pre-activations (15), which are a vector of the same dimension as the final feature vector (44). In the examples presented in this text, the adaptive preprocessor (10) is a linear mapping Wx (claim 4), in which W is a parameter matrix called weight matrix and the column vector x is the primary input (8). The parameters W of the adaptive pre-processor (10) are taught (adapted, modified, step d) of the main claim using the final feature vector (44) Nebbish learning so that the modification of the weight matrix W is directly proportional to the product yx', in which the column vector y is a feature vector (44) and x' is the transpose of vector x. It is preferable to normalize the rows of the weight matrix W back to unit vectors always after a modification. Moreover, it is preferable to use a sensitation property in the adaptive pre-processor (10). This means that each element in the pre-activations (15) is multiplied by some sensitation parameter $g\_i$, the purpose of which is to make the average of each feature vector (44) constant over the set of input information. The notation $g\_i$ means the $i^{th}$ element of vector g. The adaptive pre-processor (10) measures this activation level, and slowly increases or decreases values $g\_i$ so that all average activation levels are brought to the same level (claim 14). This increases the information presentation capacity of the entire network. All features are in use, and a situation, wherein all elements of the feature vector would be almost always inactive (close to zero), is avoided.

The predictor (11) computes a prediction (16) in step a) of the main claim on the basis of the context (9). The parameters of the predictor (11) are modified in such a way that the prediction (16) computed on the basis of the context input (9) of the predictor are closer to the pre-activations (15) than before as stated in claim 2. The predictor can be any kind of method that uses supervised learning, like a linear predictor, which has been used here (claim 4), or a multi-layer perceptron.

The combination of the predictions with the activations (12) is performed in the following way (step c) in the main claim). First, all negative elements of the pre-activations (15) and the prediction (16), if they exist, are set to zero value. Thereafter, it is ensured that all members of the prediction vector are at most one. If some value is higher, the prediction vector is divided by this number. This prevents that two processing units, which give context to each other, would strengthen each other's activations without limits.

Thereafter, the combination (47) is obtained by means of the formula y_comb=y_pre*m(1+y_pred), where y_comb is the combination (47), y_pre is the pre-activations (15), m is a modulation factor, for instance m=1, and y_pred is the prediction (16). This formula causes that the prediction (16) given by the context can not create activations, but it can strengthen active elements of the pre-activations (15).

Hereby, the features presented by the network i.e. features, whose values differ from zero, are always present in the primary input (8).

Decorrelation of features (13) means reducing such activations that correlate with each other and are active at the same time at a particular moment (claim 5). It has two effects. On one hand, it reduces the risk for the adaptive pre-processor (10) to fall into a situation, wherein all elements describe the same features. On the other hand, the selection of the decorrelated features is easier and processing is easier on the next processing unit level, if the features are fed into such a level. When common activations are subtracted from correlating features, it is thereafter easier to see which features really are present in the primary input. De-correlation is implemented with the formula y=x−Ax, in all embodiments used in this text, wherein y is the decorrelated activation vector (48), x is the combination (47) and A is a decorrelation matrix. Matrix A is adapted for instance by means of the final feature vector (44). The diagonal elements of A are kept zero, so that the vector elements would not inhibit themselves. The other elements A_ij of A are estimated correlations of elements i to j of the feature-vector (44).

Figure 8:
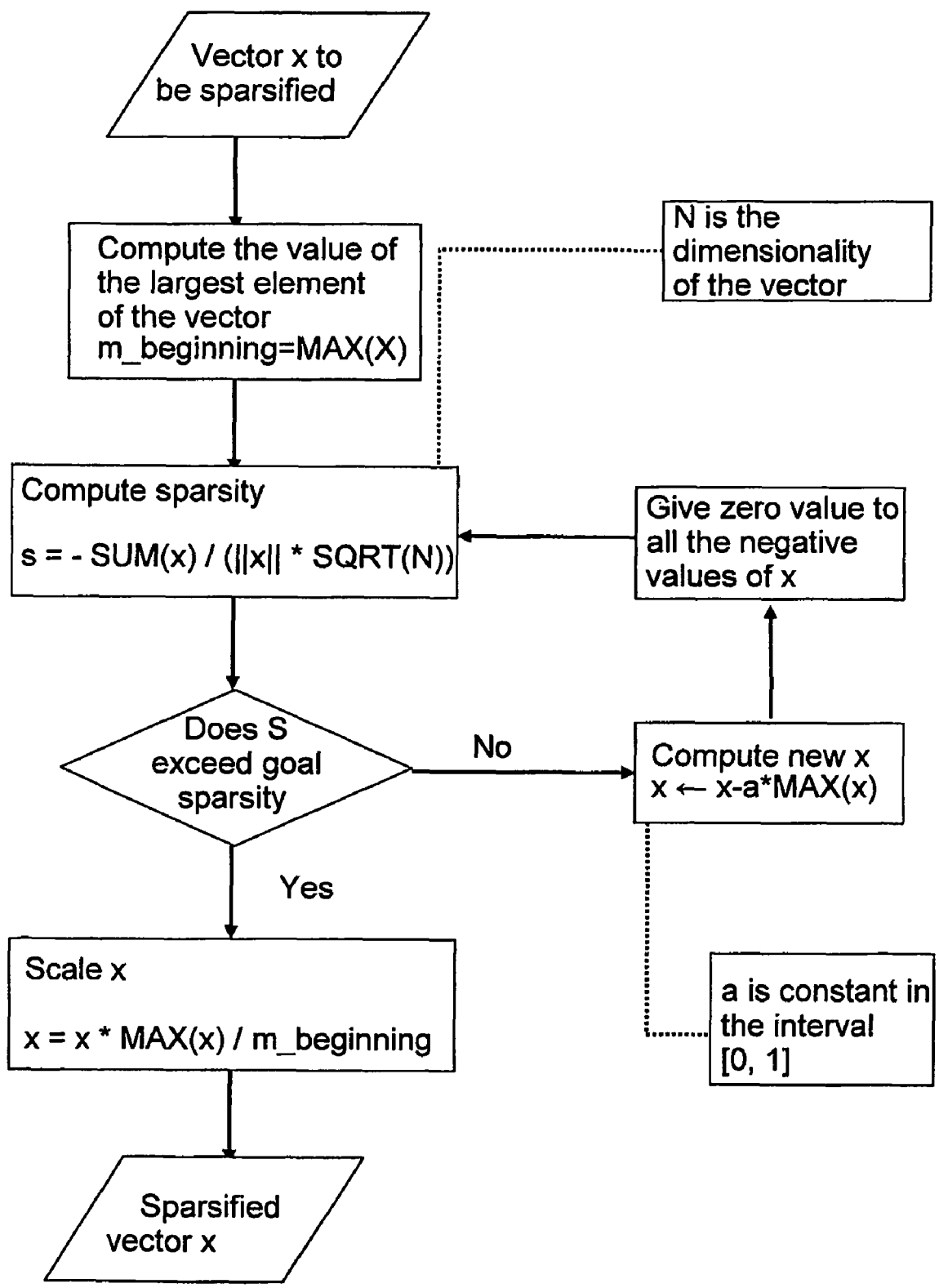
FIG. 8 illustrates a flow scheme of an algorithm, which sparsifies the activations of a vector in a computationally efficient manner.

The sparsification (14) of claim 6 prunes active features in such a way that only a few elements of the feature vector differ from zero. In the embodiments presented in this text, the sparsification is performed with the algorithm of FIG. 8. For the feature vector y (column-vector), the sparsification measure s=−SUM(y)/SQRT(N*y'y) is used, in which SUM is the sum of the elements of the vector, SQRT is the square root, N is the number of vector elements and * means multiplication. Thus, the sparsification measure of the vectors of different lengths becomes comparable. Moreover, scaling of all elements of the vector with a constant does not change the sparsification measure. The vector to be sparsified is updated iteratively as long as the sparsification measure exceeds a pre-set threshold. This threshold is a constant, which has been determined at the definition phase of the network. In the embodiments described in this text, this limit is achieved by forming a vector, which the definer considers sparse enough, and by computing a sparsification measure for this vector. A vector, in which 5% of the elements have value one, the rest of them having value zero, are used in the embodiments of this text. The update rule of vector x to be sparsified is the following. First x←x−a*MAX(x) is calculated, wherein ← means the assignment operation, m is some constant in the interval [0, 1] and MAX returns the highest value of the vector. Thereafter, all values lower than zero are converted to zero. When the vector is sparse enough, it is multiplied with the number MAX (the original vector)/MAX (the new vector), if it contains elements other than zero. Finally, the obtained vector is set to be the feature vector (44).

In the case of FIG. 7, the utility is estimated implicitly (claims 9 and 11). The utility is in the embodiment defined in such a way that the ability to predict the context with help of feature information is useful. FIG. 7 shows an implementation, in which a prediction is made from the context, which prediction is combined with the preactivations computed from the primary input. The steps shown in FIG. 7 (11)-(14) relate to the estimation of the utility.

Test Results

Figure 9:
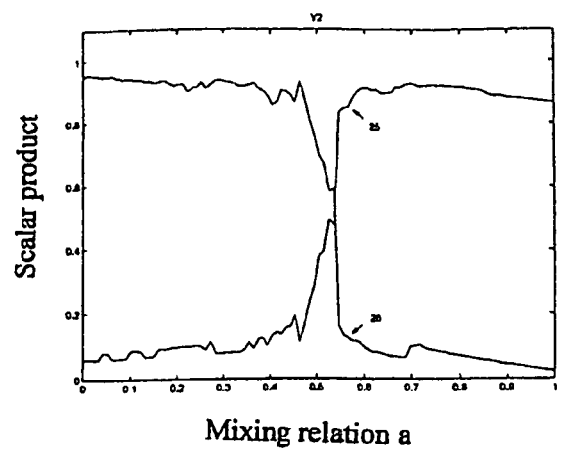
FIG. 9 illustrates simulation results of integration and selection of information.
Figure 9:
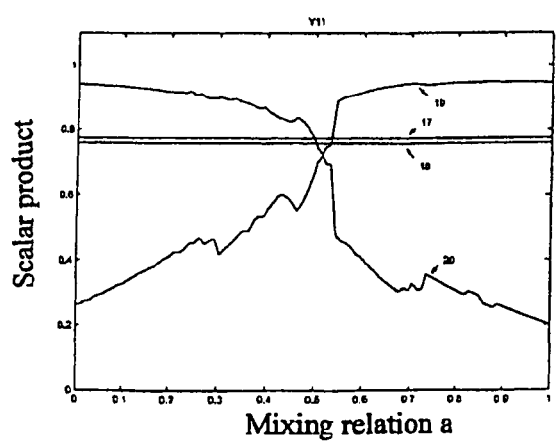
Figure 9:
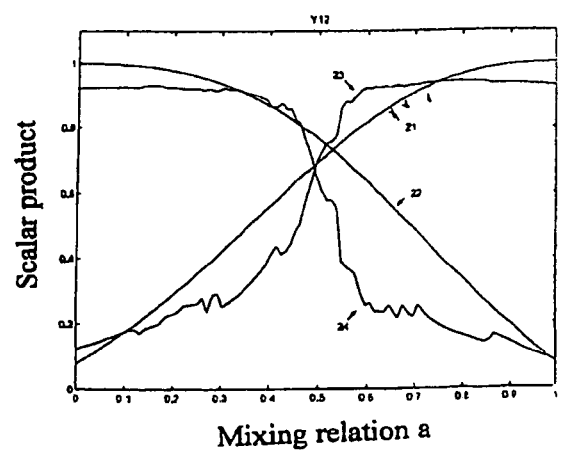

FIG. 9 presents a simulation result of integration and selection of information by using the method of the invention. In this particular example, a network was used, which included processing units of the embodiment of FIG. 7 in a hierarchy of two levels (claim 17). The first level had 12 processing units of 30 features. These were divided into two areas without any direct context connections between them. The result from these areas was fed as primary input to the second level (claim 15), which had 4 processing units of 30 features. On the second level, all processing units got context from all other units, and moreover they fed context to all processing units on the lower level (claim 16). The network was taught with 30 input vectors so that the input always consisted of a noiseless input vector. Thus, each processing unit had its own set of input information, the members of which (the pieces of input information) consisted of a primary input and a context. The primary input to the processing units of the first level consisted of said 30 input vectors and the primary input to the processing units of the second layer consisted of the feature vectors produced by the first level. The context to all processing units consisted of the feature vectors produced by the second level.

Before teaching the network, the parameters of the linear mappings are initialized randomly. As the teaching proceeds, steps a)-e) of the main claim, are repeated for each member of the set of input information. The end result of the teaching is that the parameters have changed in such a way that the network is able to select coherent information.

After the teaching, it was studied how the network works when the given input is a combination of two original input vectors. New inputs to the set of input information were added and on the basis of them, new feature information values were computed. Different areas of the network are named here. Two different areas on the first level of network are Y11 and Y12 and the second level is Y2. Let us randomly select two input vectors among the original input vectors and name them A and B. A new input vector to be fed is formed in the network so that the part of the vector that is going to be fed to area Y11 is a corresponding part of the vector 0.5*A+0.5*B.

The other half of the vector, which is fed to area Y12, is a corresponding part of the vector a*A+(1−a)*B. Here, the mixing proportion "a" is continuously altered from value 0 to value 1. This kind of input gives as a result that the network does not represent everything about its inputs, but selects the features in such a way that they only describe some object in the input vector. When "a" is near zero, primarily just B is selected for presentation on area Y11 even if the input contains as much A as it contains B.

This can be seen from the graphs of FIG. 9. These three different graphs correspond to the three different areas of the network. All curves depict scalar products of feature vectors or input vectors with corresponding model vectors in different values of mixing proportion "a". The x-coordinate has "a" and the y-coordinate has a value of the scalar product normalized to the interval [−1, 1] in all the graphs. Reference numbers 17 and 18 are scalar products of the input vector of area Y11 with the corresponding parts of input vectors A and B. These are constants, because the mixing relation has no effect on this input. Reference numbers 21 and 22 are correspondingly scalar products of the input of area Y12 with corresponding parts of input vectors A and B. The remaining curves are scalar products of feature vectors from different areas with model feature vectors. For example, the model feature vectors corresponding to input vector A, mean those feature vectors, which have been selected on different areas, input vector A being the input to the network. Reference numbers 19 and 20 are the scalar products of the feature vectors of area Y11 with the model vectors corresponding to A and B. Reference numbers 23 and 24 are corresponding scalar products of area Y12. Reference numbers 25 and 26 are corresponding scalar products of area Y2.

These graphs show both the network's ability to integrate information and to select information. Let us look at the graph of area Y12. The feature vectors change faster than the input vectors, when the mixing proportion "a" is increased. These curves are first quite horizontal, but when "a" approaches the value 0.5 they sharply turn up. This is when selection takes place. B is no longer represented, instead the representation of A starts. The processing unit works non-linearly. This phenomenon is still stronger, when the higher area Y2 is studied. This receives its primary inputs from the lower areas, wherein some nonlinear selection already has taken place. Area Y2 strengthens this selection still more, which can be seen as a sharper rise and drop of the curves (25 and 26) when the value of "a" is around 0.5. The information integration property can be seen in the graph of area Y11. This area received constant primary input all the time, but its context from the area Y2 changes. As a result of this, it makes a different decision about the representation of the features with different values of a, such as the other areas. With small values of a, area Y11 makes a decision to present B and with higher values it presents A.

Figure 10:
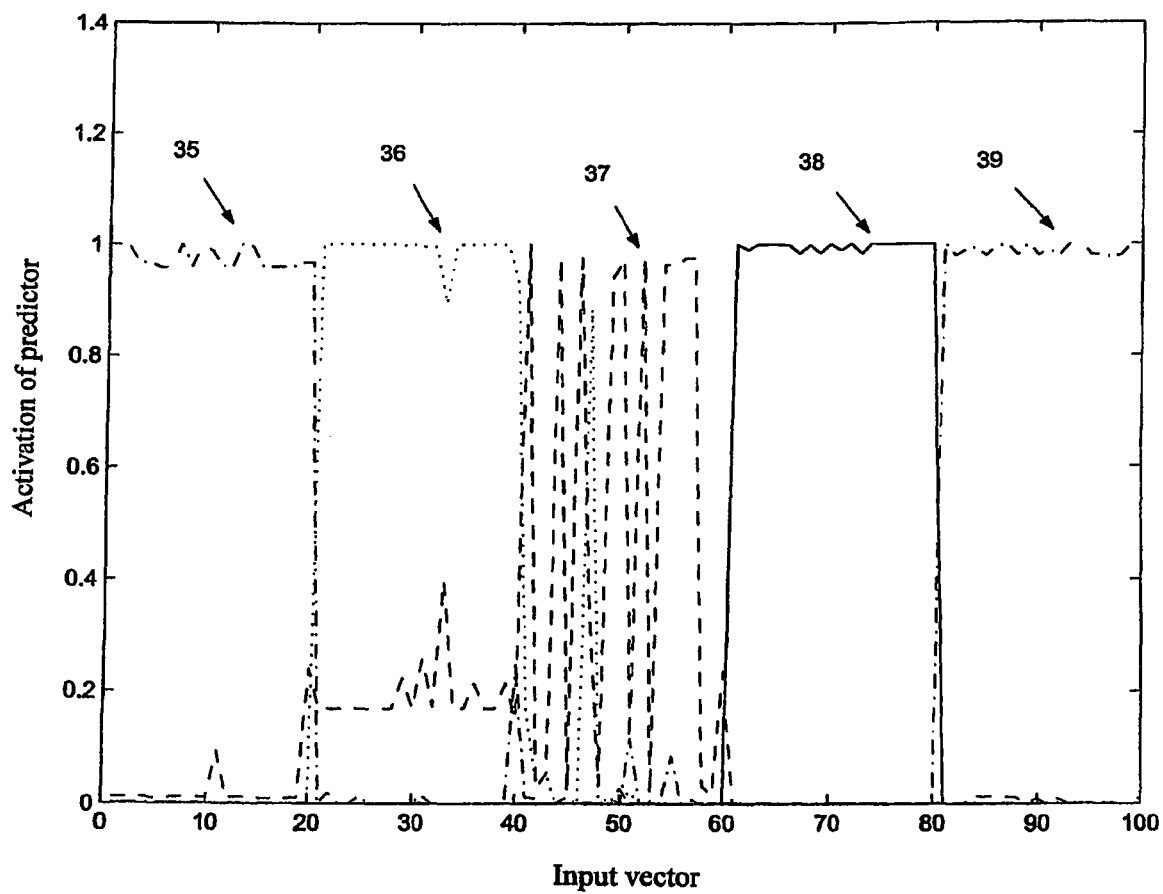
FIG. 10 illustrates simulation results from learning of invariances.

This example shows that a momentary coherence can be achieved between network parts that process different kinds of inputs. This can also be named global attention. For example in the application of FIG. 6, a visual and motor processing of a robot is brought into co-operation. When a robot performs some certain motor control, the visual part of the network processes exactly the features from the video image that are useful for the control. As there is more information in the inputs of the network than in the feature vectors presented by the network, the network makes active decisions about the utility of representing information. For instance, when in the previous simulation, the mixing proportion "a" was near value 0.5, the network emphasizes one of the objects A and B and weakens the other one. Although the processing units do not explicitly have the concept of information representation utility in this embodiment, it is implicitly represent in the network function. It is more useful for the individual processing units to present the same features as is presented in its context, so that a coherent representation to the entire network would be formed FIG. 10 presents simulation results about the ability to learn invariances in a network using the method in order. 204-dimensional vectors were given as an input to the network and they were concatenated from 9 separate pieces. Moreover, 5 different objects had been defined in such a way that each one of them had their own characteristic pieces of which the whole objects were composed. Each object had a large group of random model vectors for each piece, and some combination of these pieces was always selected to represents one object. One object had altogether hundreds of thousands of different instantiations when all combinations are taken into account. A weighted sum of some instantiated vectors of two random objects was always given as input to the network. The weight of one of the objects was one and the weight of the other one was a uniformly distributed random variable in the interval [0, 1]. If the network is able to weight learning and selecting of the processing units on the basis of the context, it has the possibility to learn different object classes from such data independently without any external teaching signal.

The network used here had six layers so that every second layer was a dimension reduction layer and every second was a convergence layer. With the latter we mean a layer of such processing units, which receive inputs from more than one lower layer processing unit. Classes learnt by the network were tested by studying the feature vectors of the highest layer in other words the sixth layer, when 20 different kinds of instantiations from all classes were given to the network as input. A combined feature vector was formed from these feature vectors of the sixth layer, which combined feature vector was fed to five linear classifiers corresponding to different classes. These vectors were normalized to unit vectors and after that a scalar product was calculated with one corresponding random feature vector from each of these five classes.

FIG. 10 presents these scalar products. The value of the scalar product is on the y-coordinate and each value on the x-coordinate describes one input vector fed to the network. The 20 first ones are random instantiations from class 1, 21-40 are correspondingly from class 2, 41-60 from class 3, 61-80 from class 4 and 81-100 from class 5. The curve (35) presents the scalar products of all 100 combined feature vectors with the combined feature vector corresponding to input vector 1. Curves (36, 37, 38 and 39) are correspondingly the scalar products of all 100 combined feature vector with one combined feature vector corresponding to each of the classes 2, 3, 4 and 5, respectively. The invariance presents itself in these results in such a way that approximately the same feature vectors were produced from all instantiations. Class 3 has been learnt worst, because only about half of the different instantiations caused similar feature vectors as the comparison instantiations. The scalar products of the original feature vectors with each other were in average close to zero, due to randomly formed model vector and the extensive amount of instantiations corresponding to each class.

These simulation results show that a network that uses our method efficiently learns to categorize totally different instantiations of the same object together. In this way, the network is able to learn an invariant representation for an object imaged from different viewing angles from or when controlling a multi-joint robot, different control signals, with which the same end result is achieved in different positions of the actuators.

Figure 11:
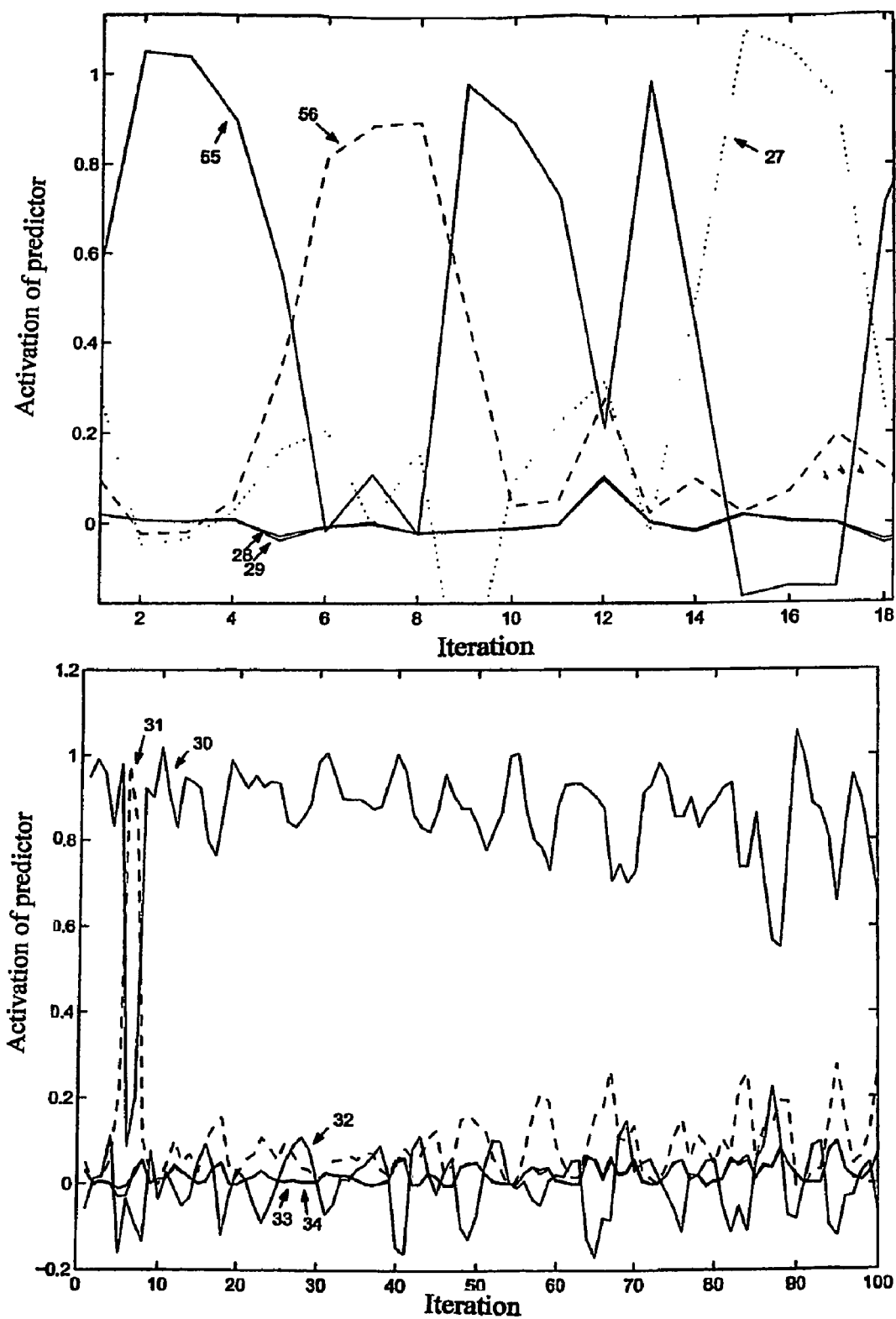
FIG. 11 illustrates simulation results from change of selection.

FIG. 11 presents simulation results about change of target of attention. Here, the same network was used as in the simulation of FIG. 10, but a fatigue property was additionally added to all context predictors, which decreased the prediction if it had been on for a long time already and the context had not changed. More precisely, smaller values than zero were replaced by zero and the result was high-pass filtered. This implicitly corresponds to reduction of utility of representation from features that have been active in a near past (claim 18). In the curves shown in FIG. 11, the x-coordinate has an iteration number and the y-coordinate has an activation of five different classifiers in the particular time moment. The classifiers are optimal linear classifiers from the sixth layer of the network for 5 different classes. In the upper graph, the sum of the instantiated vector of classes 1 and 2 has been given as an input.

The instantiations were chosen so that they as much as possible remind of the characteristics features of class 3. The curves (55, 56, 27, 28 and 29) are in order the activations of the classifiers of classes 1, 3, 2, 4 and 5, respectively.

The graph shows that the network always presents one object for a while, until the attention is transferred to another object. If the network processed images, it would correspond to a situation in which the attention would vary between different targets. Moreover, the attention can vary between whole objects and parts of objects. The target of global attention of the network could for instance at first be a chair and after that it would move to one of its legs.

The lower picture of FIG. 11 has the same network, when the input consisted of the instantiation vector of object 1 (low level features of different classes are however partly overlapping each other, so it cannot be said that the input only would consist of object 1). The curves (30, 31, 32, 33 and 34) are in order the activations of the classifier activations of classes 1, 3, 2, 4 and 5, respectively. In this case, the attention focuses almost all the time on object 1, apart from a short jump to object 3. If the fatigue of the predictors had been made stronger, such jumps would apparently be done more often. This is analogous to the situation, in which the network aims to interpret the inputs from as many aspects as possible. This example, too, shows how the network implicitly treats the utility of representing information. When some object has been represented long enough, its representation is probably no longer as useful as in the beginning, and the network alters the target of attention.

The simulations described above show that a network that uses our method is able to learn invariant classes from multidimensional data, even if these classes had not been explicitly named in the teaching situation and instantiations of different classes had not been given as input separately. Moreover, the network is able to make global decisions about the target of attention. For this decision, it integrates information from all of its inputs.

Embodiment Examples 1 and 2

Figure 5:
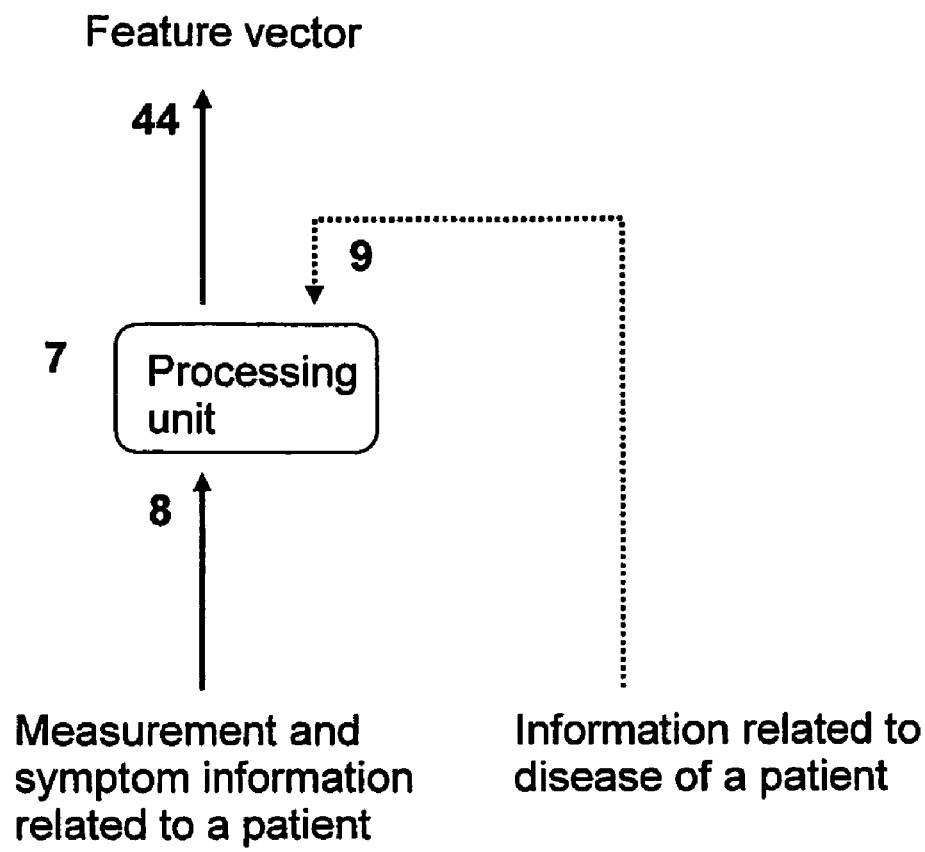
FIG. 5 illustrates an example embodiment, in which context is given outside of the system.

Even a system with a single processing unit can be useful in a practical application. Such a system is described in FIG. 5. The system tries to find such features from measurement and symptom data of patients, from which the development of given diseases could be predicted as easily as possible (claim 8). On the other hand, such characteristics can also be found with this method, which could be influenced on and thus it could be possible to influence on the development of the diseases themselves. The processing unit 7 gets patient data as its primary input 8. This data can consist of e.g. blood values and other measured parameters and of symptoms described by the patient and figured out by the doctor. The information about diseases observed in the patient earlier is given as context 9.

The processing unit 8 does not only produce static information about different features. In addition, it learns to select those features at each time instant, which best relate to the diseases of the patient.

The second embodiment example for our method is a control system of a robot (claim 7).

Figure 6:
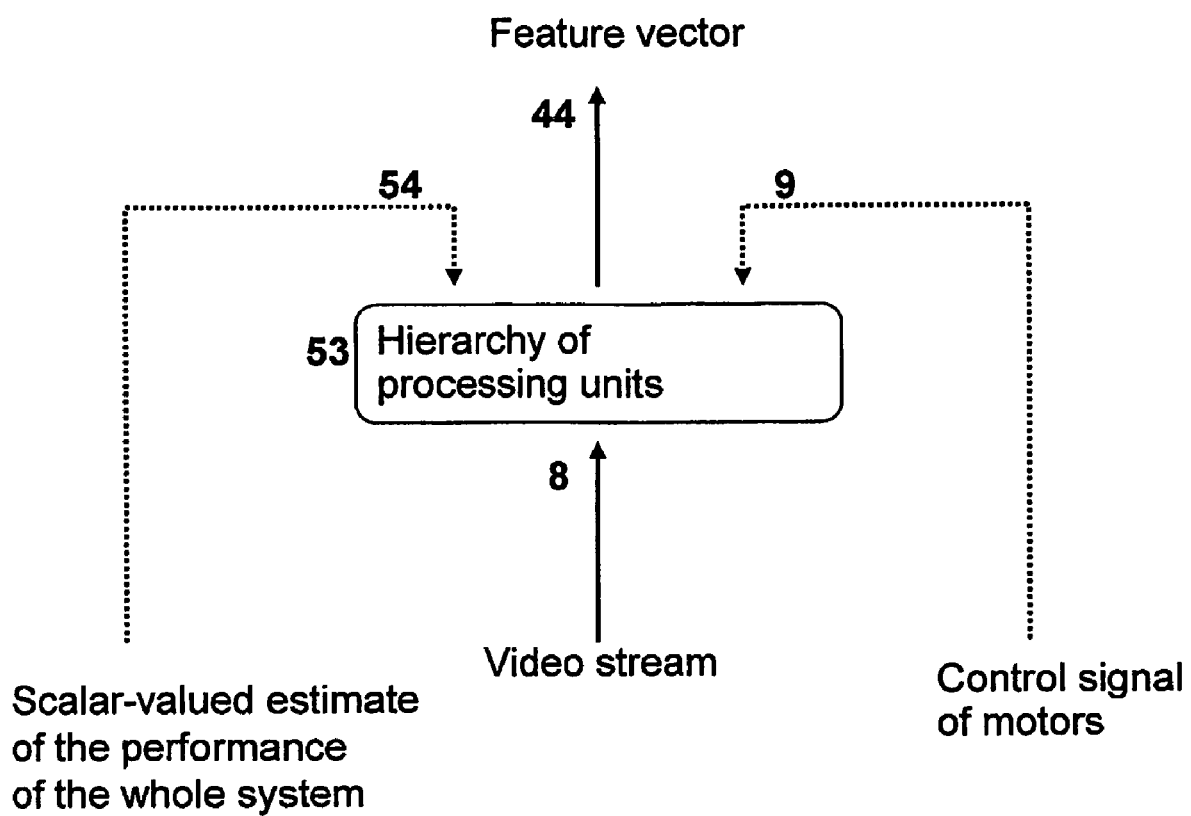
FIG. 6 illustrates an example application, in which context is given also inside of the system.

This embodiment is depicted in FIG. 6. The primary input 8 to the system consists of video images and the context consists of a control signal for its motors. This control signal is produced by some external module using feature vectors 44 of a visual system 53 as its inputs. The hierarchy 53 of the processing units is of the same type as in FIG. 4 but has more processing units. Four levels are used in the example, half of which are dimension reduction levels.

The visual system 53 gives context to itself internally, such as the network of FIG. 4. This way, the network learns continuous coherent entireties from the video image. Furthermore, the attention is paid to entireties therein. As the visual system 53 gets control signals 9 as its context, it learns to represent those visual features that are connected to the adjustment of the robot. Distant objects are for instance filtered out and those in the vicinity of the actuators of the robot are represented. In accordance with claim 19, only new information is represented in the visual system 53. When for example the robot moves some of its actuators, it is possible to predict that a moving actuator can be seen in the video image 8 and hence does not need to be represent in the visual system 53 anymore. Instead, some other information with more utility is represented therein Furthermore, a characteristic of claim 20 is used, which causes the visual system to represent targets that are important in view of subsequent time instants for the control. If for instance the actuator of the robot is moving against a wall, the visual system 53 is able to predict the braking actions and other adjustment actions to come. The wall and the moving actuator are now those factors that predict the adjustment to be done in the best way and they are selected to be represented in the visual system 53. Then the external controller can react already before a collision.

The feature of claim 21 adds an external module to the system, from which a general evaluation 54 about the success of the operation of the whole system is obtained. This scalar evaluation is used to increase the learning of the visual system 53 when the system performs well and to decrease the learning when the performance is bad. In this way, the system learns to represent those features even stronger, whose representation leads to a good performance.

Embodiment Example 1 More in Detail

Auxiliary System for Patient Diagnosis

In this example, such features are selected from patient data, which facilitate the diagnosing.

The primary input contained in the input data consists of the measurement results of the patient and the symptoms observed in the patient.

The measurement results contain blood values (hundreds) and gene expression activities (thousands) measured with a gene chip. The blood values contain concentrations of natural substances in blood, immunology indicators and external substances. The symptoms are described with the values zero and one. If the patient has a given symptom, the element corresponding to this is set to value one, when it otherwise would have been zero.

One processing unit is used in the application. The processing unit is not allowed to make a diagnosis directly from the primary input, because it is trained with a training set, i.e. its parameters are modified, before it is taken in use as an aid for diagnosing.

The above described inputs of patient data and the context from a group of patients are used as a set of training data. The more training data there is the better the processing unit can be trained. Usually data of at least ten patients is needed but data from thousands of patients can also be used.

Before the training starts, the parameters of the processing unit are initialized with random values. As a result of the training, the parameters of the processing unit are modified in such a way that the processing unit produces useful feature information in view of diagnosing from patient data. After the training, the invention can then be used for example as a help for doctors in health centres.

If not otherwise stated, the processing unit works as in the simulation of FIG. 9. When the input data of one patient is given for the processing unit, the following steps are performed, being described later more in detail:

1. Preprocessing of the primary input (step b of main claim).

The preactivations of such features that facilitate diagnosis are calculated from the input data. This is performed with a parameterized function, the parameters of which are constant during the performing of one diagnosis, but are modified (improved) always in connection with a new diagnose. More useful information is formed from the primary input by means of the parameters. The parameters are modified after each diagnosis to be parameters by means of which this function (preactivation) already originally would have given feature information of a type that was obtained at the end (step d of the main claim). Then the features represented by the processing unit will gradually change to become as useful as possible.

2. A preliminary prediction about the final feature activations is formed from the context (step a) of the main claim).

A prediction of the preactivations is calculated from the context. (Here the prediction does not refer to prediction about future but to regression). This is performed with a parameterized function, the parameters of which are constant during the performing of one diagnosis, but are modified (improved) always in connection with a new diagnose.

3. The prediction is combined with the preactivations so that the predicted features are strengthened and the other ones weakened (Step c of the main claim).

4. In this stage, the features are preferably decorrelated, in other words, the differences of the features are emphasized and their similarities are weakened (claim 5). The final feature activations, i.e. the final feature information is obtained by selecting the most active features after the foregoing step (claim 6).

First, a prediction of the preactivations is calculated from the context. There are 1000 preactivations, as was said above, and the length of the context vector is 500. The parameterized function we used for the calculation of y_pred of the prediction is a matrix multiplication, wherein all the elements of a matrix W_pred of the size 1000×500 are modifiable parameters. The prediction is calculated as y_pred=W_pred*z, wherein z is a context vector. Even if the actual blood levels of the patient can not be accurately predicted from the diagnosed disease history of the patient, this is an essential step, when a task-dependent utility is desired to be used in the selection of the feature. It is, however, possible to predict, from the disease history of the patient, that the some blood values probably are higher than the others. With this prediction, it is possible to guide the selection of the features from the blood values.

More in detail, the preprocessing of input information takes place in the following way. The input information is a vector with a length of 4000. A nonlinear expansion is performed for it by means of random projections so that a vector of a length of 20000 is obtained. This means that, in the creation stage of the processing unit, a matrix A_rp of a size of 20000×4000 has been formed randomly, and a vector b of a length of 20000. A nonlinear expansion x_nl is calculated from the input information vector of a length of 4000 with the equation x_nl=tan h(A_rp*x+b), wherein tan h is a hyperbolic tangent and '*' means multiplication. A consequence of this preprocessing is that linear components can be used as the real feature components, which, however, correspond to versatile nonlinear features in the 4000 dimensional space. This makes the finding of useful features more efficient. Furthermore, the correlation structure of the new vector x_nl is made spherical, which means that there are as few correlations between its elements as possible, and the variances of the elements are close to value one. This is implemented by multiplying it from the left side with the whitening matrix A_wh. The members of this matrix are set before the actual training starts. The whitening matrix is set by principle component analysis whitening, a method widely in use. This sphering of the correlation structure is useful for the reason that, when used, the activation magnitudes of the inputs do not determine the type of features that will be learnt, instead useful features can be learnt.

In the following, the preactivations of features that facilitate diagnosis are calculated from the input information. Now, there are 20000 elements in the input information and we use 1000 feature elements. Thus, we are calculating activations for 1000 different features. We use matrix multiplication as a parameterized function, wherein all the members of a matrix W of the size of 1000×20000 are modifiable parameters. The preactivations y_pre are obtained by calculating y_pre=W*x_wh, wherein x_wh is x_nl whose correlation structure has been sphered.

Thereafter, the prediction is combined with the preactivations so that the predicted features are strengthened and the other ones weakened. The combination y_comb=y_pre*(1+y_pred) is calculated, wherein the multiplication between the vectors is performed elementwise. The result of this way of combination is that those features that correspond to the context are strengthened. The prediction alone, however, is not able to form new activations, it can only strengthen existing preactivations.

Decorrelation is made in order to have all features to represent different things about the patient data. Decorrelation is performed by multiplying y_comb from the left side with the matrix A_dec. The members of this matrix are modified in the same step as the other modifiable parameters.

Sparsification

The final feature activations y are obtained by selecting the most active features after the foregoing step. This is performed in a way described in connection with the description of FIG. 8. The threshold value of the sparsification needed here is set to a constant value in the beginning before starting to train the processing unit. This is performed so that the sparseness measure is calculated for a sparse model vector following to the description of FIG. 8. This model vector has the same dimensions as the feature vector of the processing unit and 5% of the elements (by rounding up) of the model vector have been set to value one, whereas the value of the other elements is zero. This model sparseness is set to be the threshold value for sparseness.

When the final features have been calculated, the processing unit is trained, i.e. the parameters W, W_pred and A_dec are modified.

The parameters W of the function for forming the preactivations are modified so that this function already originally would have produced feature activations closer to the values obtained at the end. In this way, the features represented by the processing unit are modified to be as useful as possible. The parameters are modified so that a*y*x_wh^T is added to matrix W, wherein "a" is the learning rate and ^T means transpose. The learning rate a=0.00001. Finally, the rows of matrix W are normalized to have a unit length.

The parameters of the function, which predicts preactivations from the context are modified so that they already originally better would have predicted the preactivations of the features of this patient. The parameters are modified so that a_pred*y_pre*z^T is added in the matrix W_pred, wherein the learning rate a_pred=0.001. The decorrelation parameters are modified so that a_dec*(-y*y^T-A_dec) is added in the matrix, whereafter the diagonal members of the matrix are set to be one. The learning rate a_dec=0.01.

After this, the patient data of the next patient in the training data is treated and corresponding input information is formed. The method is repeated from step 1 until the whole training data has been treated. Thereafter the processing unit is ready to be used for analysing new patient data. The analysis of new patient data is performed by following the same steps as when processing the training data. The modification can, however, be prevented, if necessary, since it is not sure whether the patient data to be treated in the health centre is as reliable as the material selected to be used as training data.

The result of the processing is that the system processes the measurement results of the patient so that they are in a practical form for diagnosis. Furthermore, it selects those features from this extensive amount of data, which are the most essential in view of the disease history of the patient. Then they are highly probably also the most essential in view of a new disease to be diagnosed. When the processing unit combines the prediction given by the context with the preactivations of the features, the utility of the representation of different features is taken into consideration in view of the final utility when selecting features.

Embodiment Example 2 More in Detail

Visual System for Robot

In this example, a processing unit is trained to select such features from video camera data of a robot which enable an appropriate control of the motors of the robot.

When a robot works in a complex environment, the visual system has to identify such obstacles from a camera image that the robot should avoid, forms of the terrain that influence on the moving of the robot, as well as objects and positions of objects to be manipulated by the robot.

For this, many processing units in a hierarchy are used. The units of the first level receive different parts of the video camera image (primary input) as input information. They receive control signals and features from other processing units of the hierarchy as context. The processing units of the upper levels get the same context but the primary input data they get consists of features selected by the processing units of the lower levels. The lower levels select features that correspond to simple local forms in the camera image. The features selected by the upper levels correspond to complex objects and other structures in the camera image.

The features are not only static but describe also the movements of the objects and the interactions between them. This is in the first hand achieved by giving primary input from three subsequent time points to the lowest layer, and in the second hand by giving context from both the current time and from two previous seconds and two future seconds. The current context is used in the same way as in the patient data application. The context of the near past in turn is used in a way according to claim 19. If the past context is able to predict current features, the utility of representing them is decreased. The context of the near future is used in a way according to claim 20. This context is not used when the processing unit calculates its features but it is used in step d of the main claim. If the context of the future is able to predict the current features, they are weighted in the parameter modification step more than others.

The implementation of a control system of a robot is in practice possible by means of such features, unlike directly by means of a raw camera image. The calculation of the utility in accordance with claims 19 and 20 causes the system to try to represent nove information all the time. Furthermore, on the basis of such information, it is possible to predict future control signals for the motors of the robot. Such features are useful in tasks where control signals are selected.

In this embodiment example, a robot on wheels is used having a hand intended to manipulate objects. The hand has two joints and an actuator able to grip by closing the hand. Both joints have two motors and the gripper has one motor. In addition, both wheels have one motor. The video camera is situated in front, in the body of the robot. It does not move along with the movements of the hand. An image of the size of 100×100, i.e. 10000 pixels, is obtained from the video camera. The frame rate is 10 images per second. The control signals of the robot are produced in a separate control unit, which receives the feature information produced by the processing units of the upper level of the hierarchy and other information needed (positions of the joints and gripping hand, the forces acting on them and the goal of the action) as its input. The control unit learns from the feed-back it gets (we have used SARSA-learning, which is a method commonly used) and through predefined reflexes (using so-called cerebellar learning). Essential in view of this invention is that the control unit is able to produce control signals that are sensible for performing the task on the basis of the information received. All control signals of the motors are given as context to all processing units.

There are four levels with processing units. The first one of these gets still frames from three successive time points. It learns dynamic features in this way. The first level has 10×10 processing units, each of which gets a part with a size of 10×10 pixels of the original image as input information. Each unit naturally gets a different part of the image. The units of the first level calculate 800 features. The second level also has 10×10 units, each of which get the features calculated by one unit of a lower level as its input information. Each unit of the second layer calculates 150 features. The third layer has 5×5 units, each of which gets features from four units of the second layer as its input information. Each unit in the third level calculates 1000 features. The fourth level also has 5×5 units, each of which gets the features from one unit in the lower level as its input information. Each unit in the fourth level calculates 100 features.

The second and the fourth levels calculate a smaller number of features from a large number of features. Thus, they perform dimension reduction. This is useful, as it forces these units to generalize. Features which are irrelevant for motor control are filtered out and the remaining features are useful and generalizing.

Before the system is used as a part of a control system for a robot, it is trained, i.e. its parameters are modified, with a training set. First, all parameters are initialized randomly. The threshold values of the sparsification are initialized by means of a sparse model vector, in the same way as in the patient diagnosis application. Training data is obtained by controlling the robot manually, without any automatic control system, and by controlling it by simple automatic control series. In this way, the training data obtained consists of both camera images collected by the robot and simultaneous control signals for the motors. When the system is used as a part of a control system for a robot, this modification of parameters is continued.

Each processing unit works individually like in the auxiliary system for patient diagnosis, except for the preprocessing and the use of the context in accordance with claims 18-21. The treated data is, of course, different but the mechanism of operation is the same barring exceptions which are specifically mentioned.

As many processing units are used in this application, the features (feature information) produced by each of them are calculated many times for each still-frame triplet, and the modification of the parameters is not performed until at the end when the whole system has calculated all features. This iteration is performed in the following way. First, the processing units at the lowest level of the hierarchy calculate their features (feature information). Then the calculation proceeds level by level to the top of the hierarchy. After this, the calculations proceed in reversed order from top to bottom. This iteration is necessary, because when the individual processing units select features, the input and context information of the other units changes. This iteration upwards and back downwards in the hierarchy is performed twice for each still-frame triplet. Then all processing units have time to modify the features they have calculated to correspond to their contexts.

An individual processing unit calculates the features in the following way:

1. The primary input information is preprocessed (step b of the main claim)

The input information of the first level is whitened, as was also done in the patient diagnosis application. It is, however, not necessary to whiten the inputs of the upper layers as the decorrelation of the features make them uncorrelated enough. The preactivations of the features are calculated from the primary input. This is performed by means of a parameterized function, the parameters of which are constant during the processing of one camera-image triplet. As in the patient diagnosis application, matrix multiplication is also used here. On the first level, feature matrices of the size of 800×100 are used, on the second level a size of 150×800, on the third level a size of 1000×600, and on the fourth level a size of 100×1000.

2. A preliminary prediction about the final feature activations is formed from the context (step a of the main claim)

Three different predictions about the preactivations are calculated from the context. y_pred1 is calculated from the past context, y_pred2 from the current context and y_pred3 from the future context. The last one of these is not calculated until later, and it is used in the step of modification of the parameters. When a unit calculates its features momentarily, only the two first predictions are used. The predictions are calculated with a a parameterized function, the parameters of which are constant during the processing of one camera-image triplet but they are always modified (improved) in connection with each new image triplet. As in the patient diagnosis example, linear regression is also used here, i.e. the predictions are obtained by multiplying the context vectors with the matrices W_pred1, W_pred2 and W_pred3. In the beginning, the context vectors z1, z2 and z3 have the features represented by all the units of the same level. Next, there are the features of that processing unit of the upper level, to which this unit gave its features and finally, there are seven control signals for the motors. In the context z2 of present time, these occur once, whereas these occur 20 times in the contexts z1 and z3 of two seconds (10 images per second during two seconds). The size of the matrix W_pred2 in the lowest level is thus 800×79357, the size of that of the second level 150× 15857, the size of that of the third level 1000×24107, and the size of that of the fourth level 100×2407. In the corresponding matrices W_pred1 and W_pred3, there are 20 times more columns, but otherwise they have the same form.

3. The prediction is combined with the preactivations so that the predicted features are strengthened and other features are weakened (step c of the main claim). When in the patient diagnosis example, equation y_comb=y_pre*(1+y_pred2) would have been used, in this application the prediction y_pred1 made on the basis of the old context has to be included in order to decrease the utility of representation the predictable features. For this purpose, equation y_comb=y_pre*(1+y_pred2−0.2*y_pred1) is used.

4. The features are preferably decorrelated in this step, i.e. the differences between the features are emphasized and their similarities are weakened (claim 5). The final feature activations, i.e. the final feature information is obtained by selecting the most active features after the foregoing step (claim 6)

In the end of the iteration, before the processing of the following image triplet starts (step e of the main claim), the parameters of all units are modified by the current feature activations (step d of the main claim). This takes place, for each unit, otherwise in the same way as in the patient diagnosis application, but in the calculation of the preactivations the prediction given by the future context is taken into consideration in the modification of the parameters to be used. When in the patient diagnosis application, the matrix a*y*x^T would have been added in the matrix W, in this application, matrix a*(y+0.2*y_pred3)*)*x^T is added.

The effect of claim 21 is obtained by modifying the learning rate "a" used by the processing units of the upper hierarchy on the basis of the feed-back signal used by the controlling unit. The feed-back signal is thus the same as the so called TD signal (temporal difference signal) used by the SARSA method. In the method used, the feed-back signal is always between 0 and 1. The learning rate used in the highest level of the hierarchy is the value (1+d)*0.00001 instead of 0.00001.

A result of all this processing is that, in the hierarchy, such features are developed, which, from the lowest level to the top level, are gradually more complex and more useful with respect to the control task of the robot. Each processing unit takes the utility into consideration, when it combines its context data with its feature activations and the selection of the features.

EMBODIMENT ALTERNATIVES

In addition to the embodiments described above, the basic idea of the invention can be performed in different alternative ways. In the above described embodiments, the processing units were separate and the selection of the representation and the decorrelation of the features were only performed inside the processing units. Alternatively, the limits of the processing units could be softer. The decorrelation could for instance be performed so that a neighbourhood of a continuous value is defined for each feature element. The closest feature elements would get a large neighbourhood weight and the more distant would get a lower value and the most distant would not belong to the neighbourhood at all. Also, the selection of the representation features and of the adaptation features could be performed with such an algorithm that dynamically allows a more local or more extensive selection depending on situation.

The processing units can be performed either with a program or for instance with a processor specialized on the method. The embodiment is thus not limited to any physical realization. Also, the activations of the features can be represented in other ways than with numbers. They could e.g. be represented with a specialized circuit series, analogously with voltage values.

Especially, the criteria of the utility to be obtained from the representations of the features are highly dependent on application. Novelty, coherence and relevance for the context are quite commonly used and they have been presented in this publication. Furthermore, such methods could be used, wherein context is used in two different ways: on one hand statistically in order to improve the estimation about what features there are in the primary input and, on the other hand, for estimation of which features it is useful to represent.

The invention claimed is:

1. Method in a processing unit for selecting information, the end result to be achieved being feature information to be used for performing a task, and in which method the input data to the processing unit is processed with the intention to find useful information from the input information in view of the task, which input information consists of primary inputs and a context representing general information related to the task to be performed, whereby the feature information representing characteristics of the input information is formed from the input information, the values of the feature information being further processed on the basis of its utility, characterized in that a) a prediction is formed from a first context of a set of input information by means of first parameters and a parameterized function, b) a preactivation is formed from the first primary input of the set of input information by means of second parameters and a parameterized function, c) feature information is formed from the preactivation by strengthening those characteristics whose estimated utility is high while weakening other characteristics, where the estimate of utility is based on the prediction formed in step a) in such a way that those characteristics which are predicted are considered to have a higher utility than those which are not predicted, d) the second parameters are modified in such a way that, if having been used in step b), they would have given the calculation results corresponding to the feature information of step c), e) steps a)-d) are repeated for each element of the set of input information.

2. Method of claim 1, characterized in that in step d), the first parameters are also modified in such a way that if having been used in step a), they would have given the calculation results corresponding to the preactivation of step b) or to the feature information of step c).

3. Method of claim 1, characterized in that the information is represented in the form of numerical values as numbers of different values, the numbers describing certain characteristics.

4. Method of claim 1, characterized in that the calculation results calculated on the basis of the parameters of steps a) and/or b) are averages weighted with the parameters.

5. Method of claim 1, characterized in that the feature information achieved in step c) is decorrelated by removing correlations from the values of the feature information in order to emphasize differences of the values constituting the information to achieve improved feature information.

6. Method of claim 1, characterized in that the feature information obtained in step c) or the feature information according to the foregoing claim is sparsified by selecting the highest numbers from the information in order to further improve the feature information.

7. Method of claim 1, characterized in that the feature information is used for producing a control signal for a robot, whereby the primary input consists of information about the environment and the state of the robot measured by the robot's sensors and the context consists of signals immediately connected to the control of the robot, such as control signals of the robot's motors.

8. Method of claim 1, characterized in that the feature information is used for diagnosing diseases, whereby the primary input consists of measurement and symptom data of the patient and the context consists of information about diseases observed in the patient.

9. Method of claim 1, characterized in that the utility to be obtained from the representation of characteristics is estimated in step c) implicitly.

10. Method of claim 1, characterized in that the utility to be obtained from the representation of characteristics is estimated in step c) explicitly.

11. Method of claim 1, characterized in that the utility of the parameter modification is estimated implicitly in step d).

12. Method of claim 1, characterized in that the utility of the parameter modification is estimated explicitly in step d).

13. Method of claim 1, characterized in that one or more types of input are whitened partly or completely.

14. Method of claim 1, characterized in that the numbers of the feature information is sensitized so that the average of each number describing a corresponding character over a set of input information is approximately the same.

15. Method of claim 1, characterized in that it is performed in several processing units by connecting the processing units together in such a way that they deliver the feature information they have formed to each other as their primary input.

16. Method of claim 1, characterized in that it is performed in several processing units by connecting the processing units together in such a way that they deliver the feature information they have formed to each other as context.

17. Method of claim 16, characterized in that the processing units are connected together in a hierarchical way.

18. Method of claim 1, characterized in that when estimating the utility of each feature in step c), a fact that decreases the utility and is taken into consideration is that the value of an element of the feature vector in question has been non-zero for the members of the foregoing set of input information.

19. Method of claim 1, characterized in that when estimating the utility of each feature in step c), a fact that decreases the utility and is taken into consideration is that the value of an element of a feature vector in question has been predicted to differ from zero on the basis of the contexts of the foregoing set of input information.

20. Method of claim 1, characterized in that the modification of the second parameters in step d) is performed when the processing unit has processed new members of the set of input information, and the feature information produced by step c) being the basis for the modification is calculated again in such a way that, when estimating the utility of each feature in step c), such a fact is taken into consideration as a factor that increases the utility that the value of the element of the feature vector in question is estimated to differ from zero, on the basis of new contexts of the set of input information.

21. Method of claim 1, characterized in that when estimating the utility of the features of the whole processing unit in step c), an evaluation, given by an external module, about the utility of the features represented by the processing unit, is taken into consideration as a context.

* * * * *